United States Patent [19]

Akao

[11] Patent Number: 4,639,386
[45] Date of Patent: Jan. 27, 1987

[54] CONTAINER FOR PHOTOGRAPHIC FILM CARTRIDGE

[75] Inventor: Mutsuo Akao, Kanagawa, Japan

[73] Assignee: Fuji Photo Film Co., Ltd., Kanagawa, Japan

[21] Appl. No.: 696,763

[22] Filed: Jan. 31, 1985

[30] Foreign Application Priority Data

Feb. 3, 1984 [JP] Japan ................................. 59-18084
Feb. 22, 1984 [JP] Japan ........................... 59-24331[U]

[51] Int. Cl.$^4$ ............................................. B27N 5/02
[52] U.S. Cl. ..................................... 428/35; 206/316; 206/407; 524/580; 524/584
[58] Field of Search .................. 428/35; 206/316, 407; 524/580, 584

[56] References Cited

U.S. PATENT DOCUMENTS 3,318,976  5/1967  Short .................................. 525/247

OTHER PUBLICATIONS

Modern Plastics Encyclopedia 1983-84, Oct. 1983, V. 60, #10A, pp. 67-72, 492-494.

*Primary Examiner*—John E. Kittle
*Attorney, Agent, or Firm*—Burgess, Ryan & Wayne

[57] ABSTRACT

A container for a photographic film cartridge, of which mean thickness of peripheral wall is from 0.4 to 1.2 mm, and which is molded using a resin, comprising a polymer of which the content of propylene unit is more than 70 weight %, having a melt index of 16 to 80 g/10 minutes, having an yielding point of tensile stress of higher than 250 kg/cm$^2$, having a bending elastic modulus of higher than 10,000 kg/cm$^2$, and having a notched impact strength at 20° C. measured by Izod testing machine of higher than 2.0 kg.cm/cm. This container is thin, and has superior fitness of its cap and body than conventional containers.

10 Claims, 6 Drawing Figures

CONTAINER FOR PHOTOGRAPHIC FILM CARTRIDGE

FIELD OF THE INVENTION

This invention relates to a container for a photographic film cartridge which is thinner and has superior fitness of its cap and body.

DESCRIPTION OF THE PRIOR ART

The body of the conventional container for a photographic film cartridge was made of high density polyethylene or polypropylene of which melt index (MI) was about 10 g/10 minutes in order to secure rigidity and to prevent burr and gate mark at the injection molding. The body of the container together with its cap was thickened, to obtain a higher compression strength, dropping strength and sealing and the relationship to fluidity of the molten resin to be injected. It resulted in an increase of the amount of resin to be injected. The generating rate of inferior products caused by a short shot of the molten resin was also a problem. Besides, the fitting strength between the body of the container and its cap was also a problem.

A metal container was also known (e.g. Japanese Utility Model Publication No. 46413/1983). However, the metal container was comparatively expensive, and its mass-producibility was inferior to a plastic container. Accordingly, it is not utilized now.

SUMMARY OF THE INVENTION

It is an object of the invention to provide a container for a photographic film cartridge, which is thin, of which production is easy, and of which fitness of its cap and body are superior.

The present invention is characterized by using a particular plastics.

The invention will be further understood by reference to the drawings wherein.

DETAILED DESCRIPTION OF THE INVENTION

Figure 1:
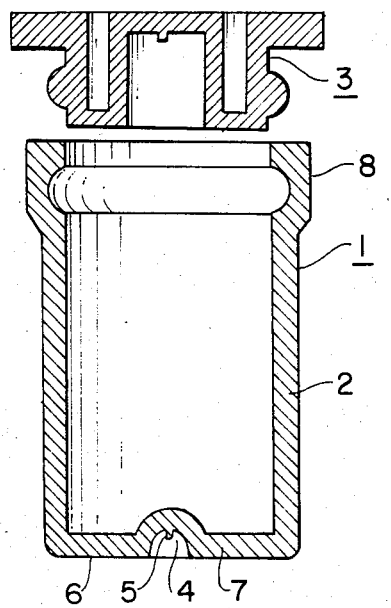
FIGS. 1-3 depict cross-sectional views of containers and covers which are prepared in accordance with the present invention.

The principal constituent of the resin forming the body of the container is a polymer where the content of propylene unit is more than 70%. Such a polymer includes a homopolypropylene, a random copolymer and a block copolymer of ethylene and propylene where the content of ethylene unit is usually less than 12 mol.%, preferably less than 5 mol.%, a random copolymer and a block copolymer of an α-olefin having a carbon number of 4 to 10 and propylene where the content of the α-olefin is less than 30 wt.%, and a blended polymer of the above polymer(s) and various polymer(s).

MI of the resin is in the range of 16 to 80 g/10 minutes, preferably 20 to 60 g/10 minutes, further preferably 30 to 50 g/10 minutes, and the yielding point of tensile stress of the resin is higher than 250 kg/cm$^2$, preferably higher than 300 kg/cm$^2$. The bending elastic modulus of the resin is higher than 10,000 kg/cm$^2$, preferably higher than 15,000 kg/cm$^2$, and the notched impact strength at 20° C. measured by Izod testing machine of the resin is higher than 2.0 kg.cm/cm.

The resin is produced from the above polymers by adding an organic or inorganic nucleating agent.

The organic nucleating agent includes a carboxylic acid, a dicarboxylic acid and their salts and anhydrides, a salt and an ester of an aromatic sulfonic acid, an aromatic phosphinic acid, an aromatic phosphonic acid, an aromatic carboxylic acid and their aluminum salts, a metal salt of an aromatic phosphoric acid, an alkyl alcohol having a carbon number of 8 to 30, a condensation product of a polyhydric alcohol and an aldehyde, and an alkylamine. Examples are aluminum p-t-butyl benzoate, 1,3,2,4-dibenzylidenesorbitol, the di-substituted benzylidenesorbitol represented by the following formula;

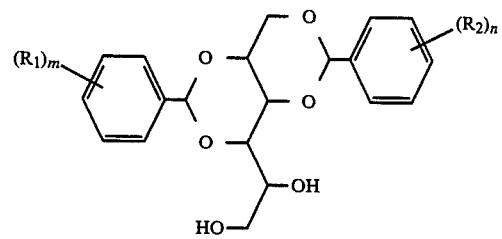

In the formula, $R_1$ and $R_2$ indicate an alkyl group or an alkoxy group having a carbon number of 1 to 8 or a halogen, and m and n are 0 to 3 and $m+n \geq 1$. a metal salt, such as calcium salt and magnesium salt, of stearyl lactic acid, the compound, such as N-(2-hydroxyethyl)-stearylamine, represented by the following formula;

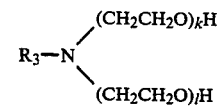

In the formula, $R_3$ indicates an alkyl group having a carbon number of 8 to 30, and k and l are 0 to 10 and $k+l \geq 1$.

a metal salt, such as lithium salt, sodium salt, potassium salt, calcium salt and magnesium salt, of 1,2-dihydroxystearate, stearyl alcohol, lauryl alcohol, sodium benzoate, benzoic acid, and sebacic acid.

The inorganic nucleating agent includes an alkali metal hydroxide such as lithium hydroxide, sodium hydroxide and potassium hydroxide, an alkali metal oxide, such as sodium oxide, an alkali metal carbonate, such as lithium carbonate, sodium carbonate, potassium carbonate, sodium hydrogencarbonate and potassium hydrogencarbonate, an alkaline earth hydroxide, such as calcium hydroxide, magnesium hydroxide and barium hydroxide, an alkaline earth oxide, such as calcium oxide, and an alkaline earth carbonate, such as calcium carbonate.

The nucleating agent is not limited to the above compounds, and any known nucleating agent may be employed. Moreover, two or more nucleating agents may be used simultaneously.

The suitable amount of the nucleating agent is 0.01 to 2.0 parts per 100 parts by weight of the polymer material.

The nucleating agent brings about various effects. For example, when 0.1 part by weight of p-t-butyl benzoate is added to 100 parts by weight of the random copolymer of propylene and ethylene, haze is lowered from 40% to 21%. The haze is further lowered to 12% by adding 0.2 part by weight of p-t-butyl benzoate. The yielding point of tensile stress is raised from 380 kg/cm$^2$ to 420 kg/cm$^2$ by adding 0.1 part by weight of p-t-butyl benzoate, but when it is further added, the yielding point is hardly raised. The bending elastic modulus is raised from 500 kg/cm$^2$ to 600 kg/cm$^2$ by adding 0.1 part by weight of p-t-butyl benzoate, but when it is further added, the modulus is hardly raised.

Such a resin is superior in transparency (haze). The preferable haze is lower than 40%, and lower than 20% is further preferable.

On the other hand, a light-shielding character may be added to the resin. In this case, a known light-shielding material may be blended into the polymer. Such a light-shielding material includes an inorganic pigment, such as carbon black, cadmium red, cadmium yellow, cadmium orange, iron oxide, cobalt blue, cobalt violet, titanium oxide, barium sulfate, barium carbonate, clay, kaolin, talc, calcium carbonate, and ultramarine, a metal powder, such as iron powder, aluminum powder, lead powder, magnesium powder, tin powder, zinc powder and copper powder, an organic pigment including a phthalocyanine pigment, such as Phthalocyanine Blue, Fast Sky Blue and Phthalocyanine Green, and a quinacridone pigment. Any other pigment known for the foregoing polymer may also be employed. The amount of the light-shielding material is usually 0.1 to 3 wt.%, preferably 0.2 to 1 wt.% with regard to the strength as the container for a photographic film cartridge and to the light-shielding. When a barium compound such as barium sulfate and barium carbonate, a lead substance such as lead powder and lead oxide, a zinc substance such as zinc powder and zinc oxide, or a tin substance such as tin powder and tin oxide is employed, X-rays can also be intercepted in addition to the usual light. Accordingly they are suitable for a highly sensitive negative film (higher than ASA 200). In this case, the amount is usually 0.1 to 40 wt.%, preferably 10 to 20 wt.%. Two or more light-shielding materials may jointly be used.

Figure 2:
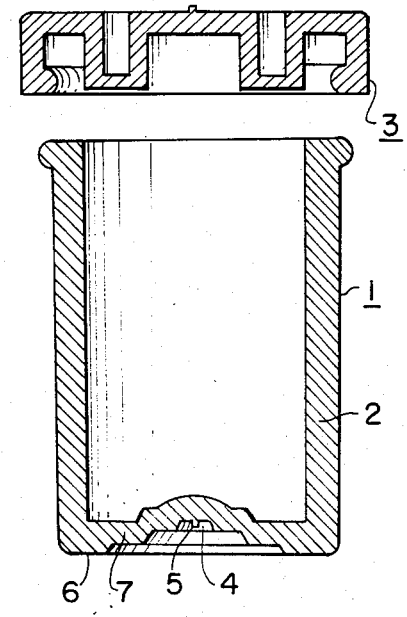
Figure 3:
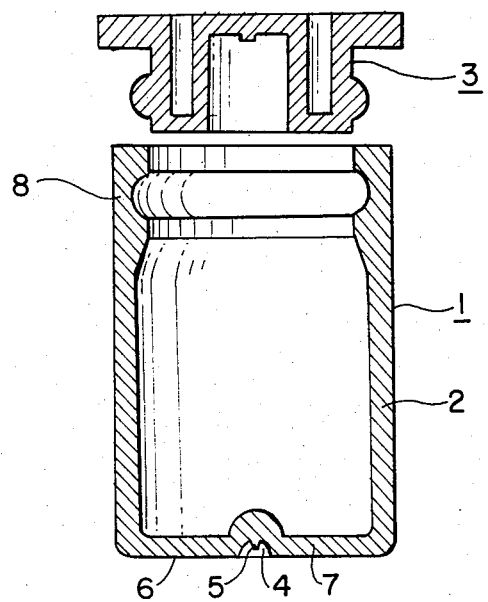

The shape of the container body is not limited, and for example, the containers illustrated in FIGS. 1, 2 and 3 are preferable in view of sealing and easy detachment. Particularly, the container of FIG. 1 is able to be detached by one hand. The thickness of the container body 1 may be thinner than the conventional one, and for example, thickness of the peripheral wall 2 is usually 0.4 to 1.2 mm, preferably 0.5 to 1.0 mm.

The preferable cap 3 is more elastic than the container body, and for example, the cap 3 made of a low density polyethylene is preferable.

The container body is usually produced by injection molding, such as inter mold vacuum injection. The metal mold capable of producing many products at once is preferable.

When the container body 1 is produced by injection molding, a small projection 5 remains at the injecting gate 4. Accordingly, this gate 4 is suitably depressed 0.5 to 5 mm, preferably 1 to 3 mm from the face 6 of the bottom 7, and it is preferably provided in a small depression. In the case of the present container body, since a pinhole is liable to form at this part 4, the neighborhood of this part 4 is preferably thickened. This is important in the case that the container body 1 is thinned, for example less than 0.7 mm. When thickness of the container body 1 is less than 0.9 mm, thickmess of the fitting part 8 is preferably thicker than that of the peripheral wall 2 in 5% or more in order to secure compression strength, fitness and moistureproofing.

The molding method of the container body is not limited to the injection molding, and the container body may be molded by the injection blow molding or the blow molding.

Since strength of the material constituting the container body is large, the container body can be made thin, and the fit of its cap is excellent. As a result, the amount of the resin employed may be reduced. Furthermore, since fluidity of the resin is good, the molding rate may be raised, and generation of an inferior product caused by a short shot of the molten resin can be reduced. Since compression strength, fitness, moistureproofing, MI (fluidity of the resin), dropping strength, etc. are improved, when the container bodies illustrated in FIGS. 1 and 3 may be 20% by weight or more thinner than the conventional bodies, the same or better quality may be secured. In the test by using the vessel body of FIG. 3, when it was thinned in 30% by weight, the container body having suitable quality for the container of a photographic film cartridge was obtained.

Figure 4:
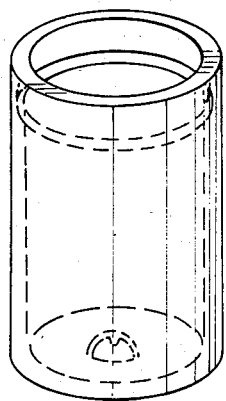
FIGS. 4-6 depict views of three additional containers of different configurations which are prepared by the present invention.
Figure 5:
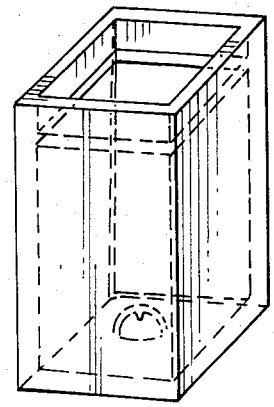
Figure 6:
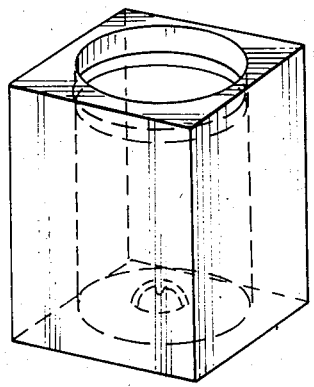

Since the resin itself constituting the container body is superior in transparency, the container body may be used for a transparent container without adding any pigment. The cost of such a container body may be reduced by the cost of pigment. When the container body is formed as a transparent body, it may also be used for the outer box which is generally made of paper. By this combination, the cost of the total package may be lowered, and a novel view may be given to the article of commerce. Furthermore, a sense of security may be given to a customer by confirming the content. Printing for ornamentation or for instruction may be added to its outer face. Examples of the combined containers are illustrated in FIGS. 4, 5 and 6. The example illustrated in FIG. 4 is cylindrical, and the example of FIG. 5 is cubic. The outer shape of the example of FIG. 6 is cubic, and the receiving part is cylindrical.

EXAMPLE 1

The body of container illustrated in FIG. 1 of which thickness of the peripheral wall 2 was 0.9 mm was molded by using the molding machine manufactured by Sumitomo Heavy Industries Ltd. (trade name "NETSTAL") at mould clamping pressure of 150t. The molding number per once was 24, and the type of runner was a hot runner.

The random type polypropylene resin containing a nucleating agent was employed. This resin comprised the polymer of which the content of propylene unit was 96 mol.% and the content of ethylene was 4 mol.%. MI of the resin was 40.0 g/10 minutes, the yielding point of tensile stress was 370 kg/cm$^2$, the bending elastic modulus was 14,000 kg/cm$^2$, and the notched impact strength at 20° C. measured by Izod testing machine was 5.0 kg.cm/cm.

In comparison, the following random type polypropylene resin not containing a nucleating agent was employed for the conventional product. This resin comprised the polymer of which the content of propylene unit was 94 mol.% and the content of ethylene unit was 6 mol.%. MI of the resin was 12.3 g/10 minutes, the yielding point of tensile stress was 270 kg/cm$^2$, the bending elastic modulus was 9,800 kg/cm$^2$, and the notched impact strength at 20° C. measured by Izod testing machine was 3.5 kg.cm/cm.

The properties of both products are compared in Table 1.

TABLE 1

| Property | Unit | The Product of the Invention | The Conventional Product |
|---|---|---|---|
| Transparency | cm | 155 | 46 |
| Compression Strength | kg | 47.7 | 36.2 |
| Fitness | kg | 3.12 | 2.15 |
| Moisture Permeability | mg/day | 2.3 | 3.7 |
| Dropping *1 Strength | % | 0 | 30 |
| Detachment of Cap | % | 0 | 10 |
| One Molding Cycle *2 | sec. | 10 | 13 |
| Temperature of Resin *3 | °C. | 220 | 240 |
| Generation of Short Shot *4 | | Rare | Occasionally |

*1 Ratio of Cracking
*2 Injection-Cooling-Taking Out
*3 At the Injecting
*4 Per 100,000 Products

EXAMPLE 2

The body of container illustrated in FIG. 3 of which thickness of the peripheral wall 2 was 0.9 mm was molded by using the same machine and under the same condition as Example 1. The resin employed was the same as Example 1 except that 0.5 wt.% of carbon black was further added. The resin employed for the conventional product was also the same as Example 1 except that carbon black was further added.

The properties of both products are compared in Table 2.

TABLE 2

| Property | Unit | The Product of the Invention | The Conventional Product |
|---|---|---|---|
| Transparency | % | 0 | 0 |
| Compression Strength | kg | 47.7 | 36.2 |
| Fitness | kg | 3.12 | 2.15 |
| Moisture Permeability | mg/day | 2.3 | 3.7 |
| Dropping Strength | % | 0 | 30 |
| Detachment of Cap | % | 0 | 10 |
| One Molding Cycle | sec. | 10 | 13 |
| Temperature of Resin | °C. | 220 | 240 |
| Generation of Short Shot | | Rare | Occasionally |

What is claimed is:

1. A container for a photographic film cartridge having a mean peripheral wall thickness of from 0.5 to 1.0 mm, and which is molded from a resin, comprising a polymer of which the content of propylene unit is more than 70 weight %, and wherein said resin has a melt index of 16 to 80 g/10 minutes, a yielding point of tensile stress of higher than 250 kg/cm$^2$, a bending elastic modulus of higher than 10,000 kg/cm$^2$, and a notched impact strength at 20° C. measured by an Izod testing machine of higher than 2.0 kg.cm/cm.

2. The container for a photographic film cartridge of claim 1, wherein said resin contains a nucleating agent.

3. The container for a photographic film cartridge of claim 2, wherein said nucleating agent is a carboxylic acid, a dicarboxylic acid or a salt or an anhydride of them, a salt or an ester of an aromatic sulfonic acid, an aromatic phosphinic acid, an aromatic phosphonic acid, an aromatic carboxylic acid, and an aluminum salt of them, a metal salt of an aromatic phosphoric acid, an alkyl alcohol having a carbon number of 8 to 30, a condensation product of a polyhydric alcohol or an aldehyde, or an alkylamine.

4. The container for a photographic film cartridge of claim 3, wherein said nucleating agent is a member selected from the group consisting of aluminum p-t-butyl benzoate, 1,3,2,4-dibenzylidenesorbitol, the di-substituted benzylidenesorbitol represented by the following formula;

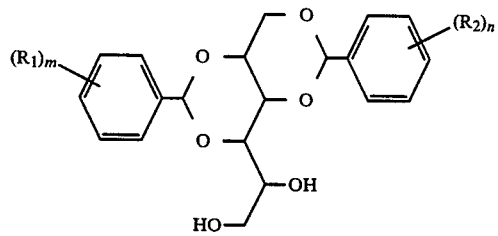

wherein $R_1$ and $R_2$ indicate an alkyl group or an alkoxy group having a carbon number of 1 to 8 or a halogen, and m and n are 0 to 3 and $m+n \geq 1$; a metal salt, such as calcium salt and magnesium salt, of stearyl lactic acid, the compound, such as N-(2-hydroxyethyl)-stearylamine, represented by the following formula;

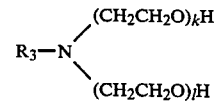

wherein $R_3$ indicates an alkyl group having a carbon number of 8 to 30, and k and l are 0 to 10 and $k+l \geq 1$; a metal salt, such as lithium salt, sodium salt, potassium salt, calcium salt and magnesium salt, of 1,2-dihydroxystearate, stearyl alcohol, lauryl alcohol, sodium benzoate, benzoic acid, and sebacic acid.

5. The container for a photographic film cartridge of claim 2, wherein said nucleating agent is an alkali metal hydroxide, an alkali metal oxide, an alkali metal carbonate, an alkaline earth hydroxide, an alkaline earth oxide, or an alkaline earth carbonate.

6. The container for a photographic film cartridge of claim 5, wherein said nucleating agent is a member selected from the group consisting of lithium hydroxide, sodium hydroxide, potassium hydroxide, sodium oxide, lithium carbonate, sodium carbonate, potassium carbonate, sodium hydrogencarbonate, potassium hydrogencarbonate, calcium hydroxide, magnesium hydroxide, barium hydroxide, calcium oxide, and calcium carbonate.

7. The container for a photographic film cartridge of claim 2, wherein the amount of said nucleating agent is 0.01 to 2.0 parts per 100 parts by weight of said polymer.

8. The container for a photographic film cartridge of claim 2 wherein haze of said resin is lower than 40%.

9. The container for a photographic film cartridge of claim 1 2 wherein a light-shielding material is blended to said resin.

10. The container for a photographic film cartridge of claim 2 which is molded by injection molding.

* * * * *